United States Patent [19]

Danckert

[11] Patent Number: 4,544,299
[45] Date of Patent: Oct. 1, 1985

[54] TRACTION- AND PRESSURE-TRANSMITTING LINK JOINT BETWEEN TWO STRUCTURAL COMPONENTS EXECUTING JOINT MOVEMENTS

[75] Inventor: Hermann Danckert, Wolfsburg, Fed. Rep. of Germany

[73] Assignee: Volkswagenwerk Aktiengesellschaft, Wolfsburg, Fed. Rep. of Germany

[21] Appl. No.: 514,649

[22] Filed: Jul. 18, 1983

[30] Foreign Application Priority Data

Jul. 17, 1982 [DE] Fed. Rep. of Germany ...... 3226817
May 19, 1983 [DE] Fed. Rep. of Germany ...... 3318215

[51] Int. Cl.$^4$ .................. F16J 1/16; F02F 3/24
[52] U.S. Cl. .................. 403/150; 403/151; 403/155; 74/579 E; 92/187; 123/193 P
[58] Field of Search .......... 403/150, 151, 155, 161, 403/344; 74/579 E, 594; 92/187; 123/193 P, 197 A, 197 AB, 197 AC

[56] References Cited

U.S. PATENT DOCUMENTS

| | | | |
|---|---|---|---|
| 902,477 | 10/1908 | Dalton | 74/594 |
| 1,822,322 | 9/1931 | Steele | 403/150 |
| 2,287,735 | 6/1942 | Halford | 74/579 E |
| 2,396,084 | 3/1946 | Clark | 403/155 |
| 2,429,410 | 10/1947 | Essl | 74/579 E |
| 2,687,931 | 8/1954 | Flynn | 92/187 |
| 2,716,578 | 8/1955 | Hurley | 74/579 E |
| 2,738,687 | 3/1956 | Meile | 74/579 E |
| 3,762,389 | 10/1973 | Malina | 92/187 |
| 4,184,384 | 1/1980 | Levine | 74/579 E |

Primary Examiner—Cornelius J. Husar
Assistant Examiner—Todd G. Williams
Attorney, Agent, or Firm—Brumbaugh, Graves, Donohue & Raymond

[57] ABSTRACT

In the embodiments of the invention described in the specification, a piston and a connecting rod of an internal combustion engine have opposed approximately semi-cylindrical bearing regions partially enclosing a pin, leaving free gaps between the bearing regions to permit swivel motions of the piston and connecting rod about the axis of the pin. Two symmetrical rings which surround the pin axis retain the bearing regions against the pin. The provision of such opposed bearing regions reduces the oscillating mass of the link joint.

4 Claims, 9 Drawing Figures

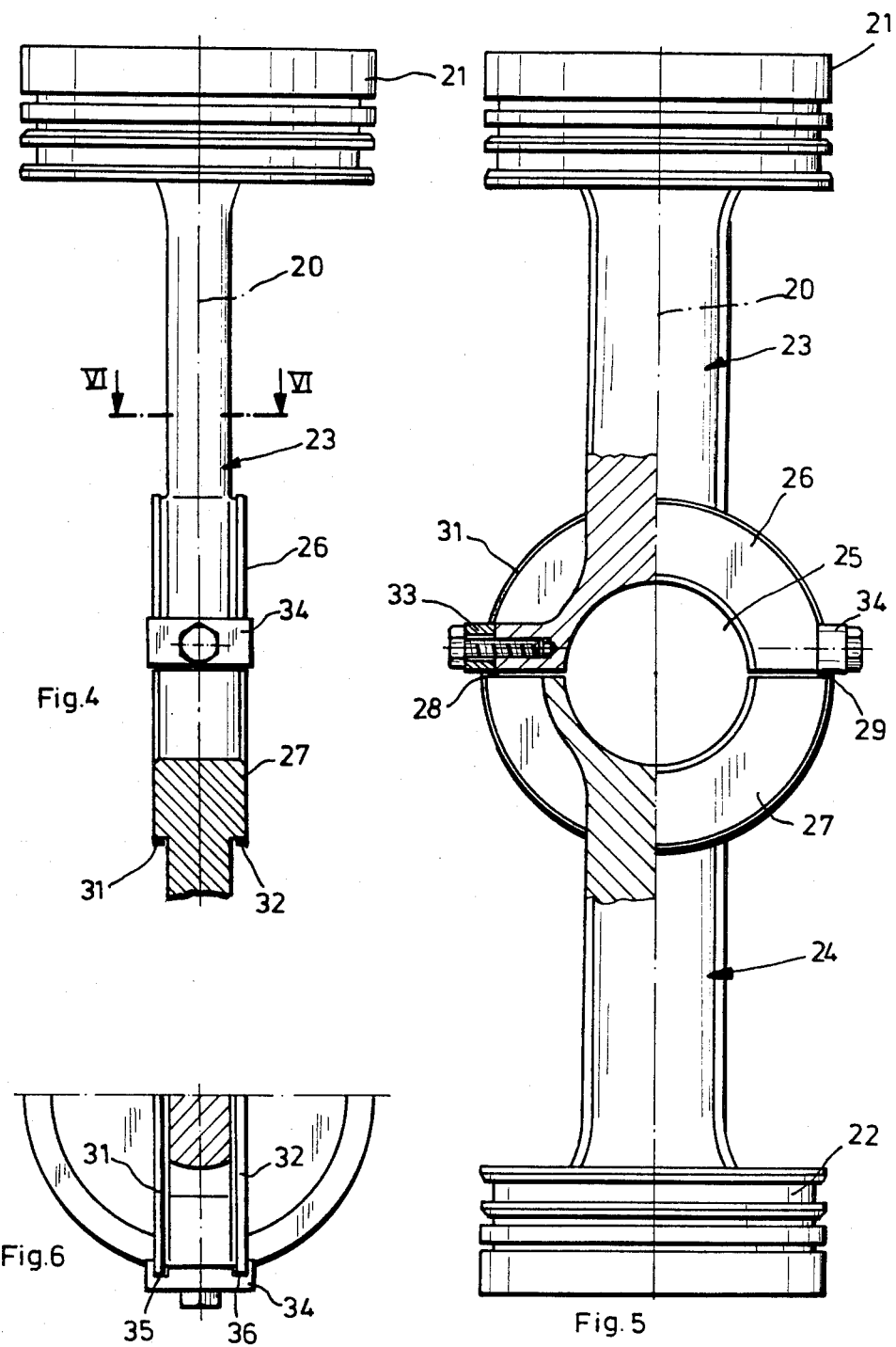

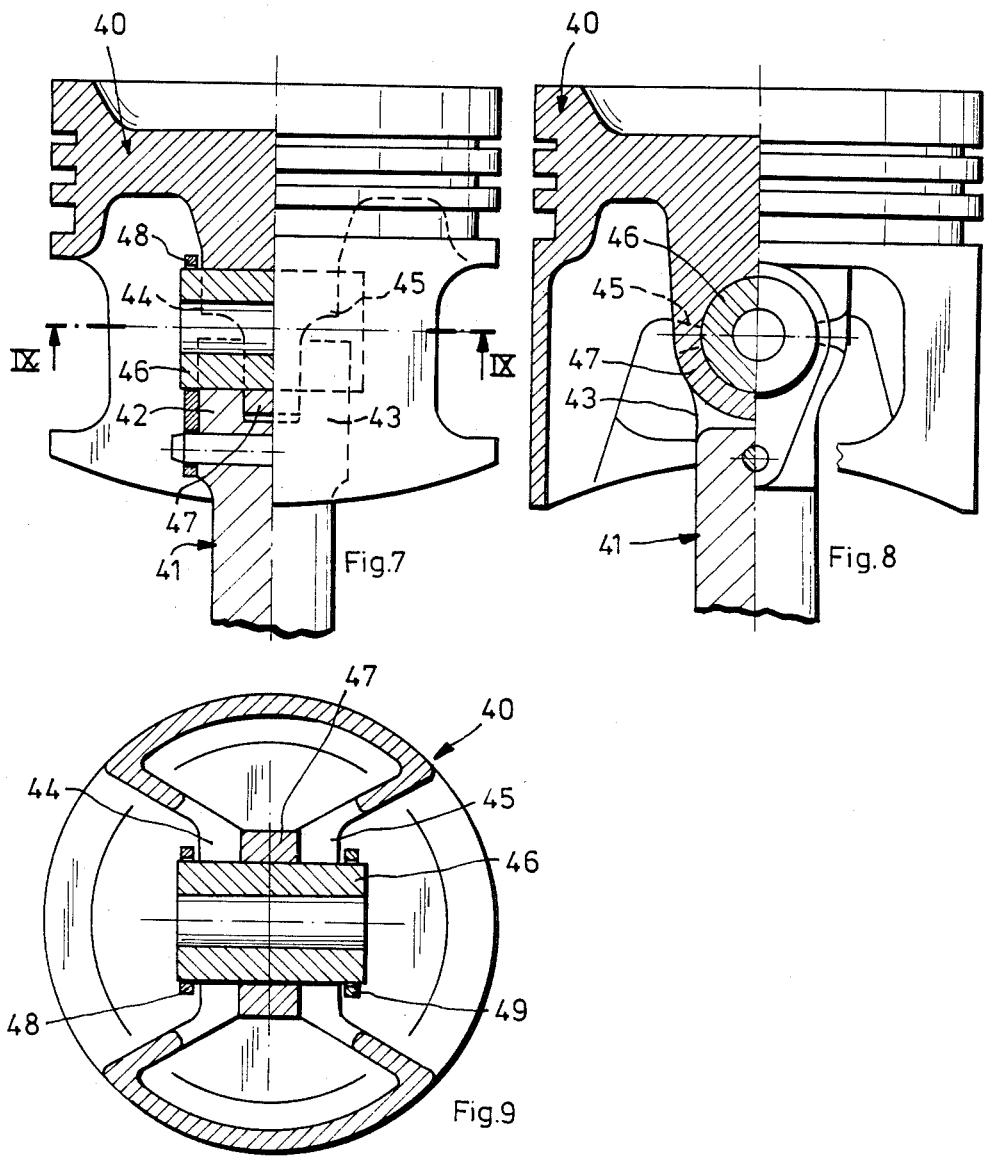

TRACTION- AND PRESSURE-TRANSMITTING LINK JOINT BETWEEN TWO STRUCTURAL COMPONENTS EXECUTING JOINT MOVEMENTS

BACKGROUND OF THE INVENTION

This invention concerns a traction- and pressure-transmitting link joint between two structural components executing joint movements, in particular on a connecting rod of an internal combustion engine, with a pin arranged perpendicular to the traction and pressure direction on which are supported bearing regions of both components permitting relative swivelling around the pin.

In a preferred application of the invention, namely, the obtention of a connection between the connecting rod and and piston of an internal combustion engine, e.g., of an automobile, the corresponding link joints as a rule are constructed in a hinge-like manner, i.e., the pin passes in the direction of its axis through alternatingly successive bearing regions of the connecting rod and the piston surrounding it, and is therefore subjected to bending stress. Accordingly, such a design of the link joint necessitates relatively large oscillating masses, and not only in view of the design of the bearing regions in forming the eyes, as it were, surrounding the pin, but also in view of the relatively large stress exerted in the pin.

Therefore, it is an object of the invention to create, generally speaking, a traction- and pressure-transmitting link joint between two structural components having a pin extending perpendicularly to the traction and pressure direction in such a manner that the oscillating masses attributable to the link joint become as small as possible.

BRIEF SUMMARY OF THE INVENTION

In accordance with the invention the foregoing and other objects are attained by providing bearing regions on the two structural components which face each other relative to the axis of the pin and extend over portions of the pin circumference which total less than 360°, the components and pin being held together by at least one ring surrounding the axis of the pin. In preferred embodiments of the invention, at least some of the bearing regions which face each other relative to the axis of the pin are open shells or partial cylinders extending by preference over less than 180° in each case. In no case do they jointly extend over the entire circumference of the pin. Consequently, gaps are maintained between the bearing regions which permit the desired limited relative swivelling of the two components, i.e., e.g., the connecting rod and the piston.

In the case of the preferred example discussed above, i.e., a link joint between piston and connecting rod, the relative swivelling between these two components is necessary to their functioning. However, it is also possible that relative movements of this kind in certain embodiments of the invention are the result of necessary tolerances. Such tolerances may also necessitate a certain parallel offset between the two components connected by means of the link joint, which offset extends in the direction of the pin axis and thus, perpendicular to the plane of the swivelling movements. One advantage of the invention may be found in the fact that this condition, too, can be achieved by simple measures. In such embodiments, it is sufficient that the ring and the pin are not fixedly supported in the axial direction relative to the two components but are supported in a manner that leaves some play which permits the desired parallel offset. In this case, too, the basic advantage of the link joint in accordance with the invention is maintained, i.e., the advantage of a small oscillating mass in that at least some of the bearing regions do not form closed bearing bosses or eyes. Moreover, in the preferred embodiment of the invention, the pin needs to absorb merely compressive stresses but not bending stresses. Tractive stresses are introduced via the ring or a plurality of rings. Preferably two rings are provided in a symmetrical arrangement surrounding the bearing regions which have a larger cross section.

BRIEF DESCRIPTION OF THE DRAWINGS

The preferred embodiments of the invention will be discussed hereinafter with reference to the accompanying drawings, in which:

FIG. 4 is a side view, partially in section, of another embodiment of the invention, looking perpendicularly to the pin axis;

FIG. 5 is a side view, partially in section, of the embodiment of FIG. 4, looking parallel to the pin axis;

FIG. 6 is a partial cross-sectional view of the embodiment of FIG. 4, taken along the line VI—VI thereof and looking in the direction of the arrows;

FIG. 7 is a side view in partial longitudinal section illustrating a further embodiment of the invention, looking perpendicuarly to the pin axis;

FIG. 8 is a side view in partial longitudinal section of the embodiment shown in FIG. 7, looking parallel to the pin axis; and FIG. 9 is a cross-sectional view of the embodiment shown in FIG. 7, taken along the line IX—IX thereof and looking in the direction of the arrows.

Figures 1, 2:
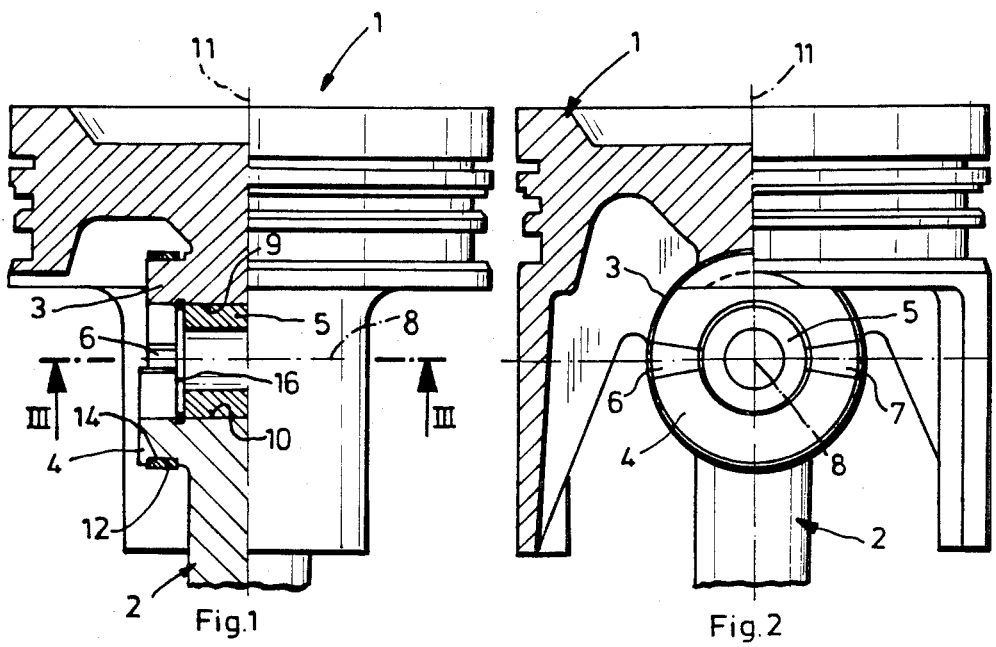
FIG. 1 is a view in partial longitudinal section, illustrating a representative portion and connecting rod arranged according to the invention, looking perpendicularly to the pin axis.
FIG. 2 is another view in partial longitudinal section of the embodiment shown in FIG. 1., looking parallel to the pin axis.
Figure 3:
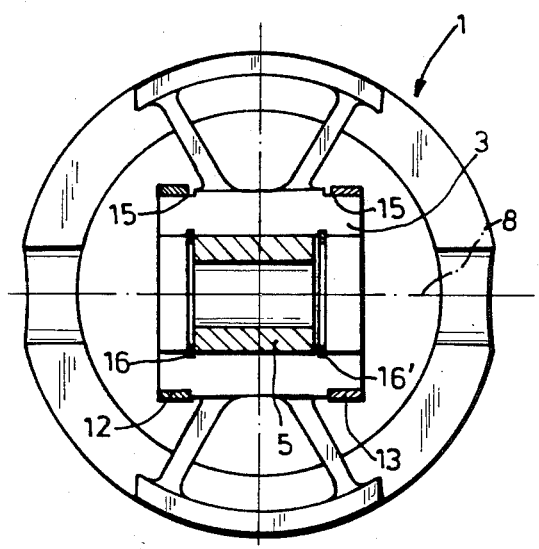
FIG. 3 is a cross-sectional view of the embodiment of FIG. 1, taken along the line III—III thereon and looking in the direction of the arrows.

In the typical embodiment shown in FIGS. 1, 2 and 3, the link joint of the invention serves to provide a connection between a piston 1 of a conventional internal combustion engine and an associated connecting rod 2 which, at its other end, is in the customary force-transmitting connection with a crankshaft (not shown). The piston-side bearing region of the joint is designated by 3, and the connecting rod-side bearing region is designated by 4. As is evident, particularly from FIG. 2, each of the two bearing regions 3 and 4 extends over less than half the circumference of a wrist pin 5, which in this embodiment is in the form of a sleeve or tube, and is preferably made of cast-iron. Consequently, there are gaps 6 and 7 between the end faces of the bearing regions 3 and 4 which face each other directly which permit limited relative swivelling of the components 1 and 2 about the pin axis 8.

The bearing regions 3 and 4 have bearing zones 9 and 10, respectively, which engage the circumference of the pin 5. The fact that the bearing zones 9 and 10 face each other relative to the pin axis 8 results in compressive stress being exerted on the pin 5 but does not produce any bending stress thereon. In this embodiment two rings 12 and 13 hold the two components 1 and 2 together on opposite sides of the pin 5 and, except for their swivelling motions, the components 1 and 2 thereby move essentially along a common axis 11. The rings 12 and 13 surround the bearing regions 3 and 4, or lateral extensions thereof, as well as the pin axis 8. FIGS. 1 and 3 show that the rings 12 and 13 in the bearing region 4 are each secured in the groove 14 against axial movement. As shown in FIG. 3, however, each ring is secured in the bearing region 3 by a groove 15 which is open on one side and which is wide enough to accommodate any necessary lateral displacement between the components 1 and 2 in the direction of the pin axis 8.

The axial fixing of the pin 5 in the space between the bearing regions 3 and 4 must also be adapted to such lateral displacement. In the event that such fixing is not obtained by means of a press fit or the like but rather by means of positive retaining elements such as shoulders in the bearing regions 3 and/or 4 or by retaining rings 16, as shown in FIGS. 1 and 3, the retaining means must not prevent small relative displacements between the components 1 and 2 in the direction of the pin axis 8. This may be achieved, for example, by holding the spring ring 16 of FIG. 1 only on top and on the bottom, in the bearing regions 3 and 4, and by providing a further spring ring 16' at the other end of the pin 5 which is spaced from the spring ring 16 sufficiently to take into account the lateral displacement.

In the particular embodiment shown in FIGS. 1-3, it is furthermore assumed that the rings 12 and 13 are installed before the pin 5 is introduced between the bearing regions 3 and 4. However, if the construction is accomplished, for example, by the use of locks to position the rings so that the rings 12 and 13 are installed after the introduction of the pin 5, the axial fixing of the pin 5 may be obtained by providing shoulders on only one of the bearing regions.

The embodiment shown in FIGS. 4, 5 and 6 illustrates another manner of application of the invention. In this embodiment, an internal combustion engine has two pistons 21 and 22 facing each other substantially along a common axis 20 and two connecting rods 23 and 24 individually associated with the pistons 21 and 22, respectively, the pistons being acted on alternatingly by pressure. The connecting rods 23 and 24 are connected with a connecting rod pin 25 of a crankshaft, constituting the pin of the link joint, in such a manner that relative swivelling of the two connecting rods 23 and 24 in the drawing plane of FIG. 5 is possible. In this embodiment, as in the previous embodiment, two bearing rods, 26 and 27, at the ends of the connecting rods 23 and 24 face each other and each of the bearing regions extends over less than half of the circumference, i.e., less than 180°, of the connecting rod pin 25. Consequently, gaps 28 and 29 are maintained between the bearing regions 26 and 27 to facilitate the desired relative swivelling of the connecting rods 23 and 24.

In this embodiment, also, the pin of the link joint constituted by the connecting rod pin 25 is not subject to any bending stress within the said link joint since the bearing faces oppose each other. Here again, two rings 31 and 32 of high-tensile material serve to hold the components 23 and 24 and the connecting rod pin 25 together. However, as shown in FIG. 4, in this case the two rings are not held by grooves bounded on both sides by side walls. Rather, they are held in grooves bounded merely in the direction towards the axis 20 and the width of the grooves is again chosen to permit necessary lateral displacement between the two connecting rods 23 and 24. The rings 31 and 32 are retained by locks 33 and 34 screwed onto the bearing region 26. As shown in FIG. 5 for the lock 34, the locks are provided with grooves 35 and 36 bounded on both sides for positioning of the rings 31 and 32.

When this embodiment is assembled, the two bearing regions 26 and 27 are first positioned on the connecting rod pin 25 and the rings 31 and 32 are then installed. Thereafter, the rings are fixed in position by mounting the locks 33 and 34.

FIGS. 7, 8 and 9 also show a link between a piston 40 and a connecting rod 41 of an internal combustion engine. The connecting rod 41 has two spaced approximately semi-cylindrical bearing regions 42 and 43 and the piston 40 also has two spaced approximately semi-cylindrical bearing regions 44 and 45 which are disposed opposite the regions 42 and 43 on the other side of a hollow pin 46 of the piston 40. In addition, the piston 40 has a further bearing region 47 completely enclosing the pin 46 and disposed between the bearing regions 42 and 44 and 43 and 45. The pin 46 and the connecting rod 41 are held together by two rings 48 and 49 surrounding the pin 46 which are affixed to opposite end faces of the connecting rod 41. If desired, the rings may also be integral with the connecting rod 41.

Obviously, the eye-like central bearing region 47 can be provided on the connecting rod instead of on the piston. In that case, the union between the pin and the piston must be created by additional measures. Such modification would also take into account the fact that, in this embodiment of the invention, the compressive forces to be transmitted are considerably larger than the tractive forces so that by substantially reducing the size of the eye-like bearing region surrounding the pin, the oscillating masses can be held small.

I claim:

1. A traction- and pressure-transmitting link joint between two structural components executing joint movements, comprising a cylindrical pin, a first structural component having a substantially semi-cylindrical bearing surface engaging the surface of the pin and lying on one side of the pin axis, a second structural component having a substantially semi-cylindrical bearing surface engaging the surface of the pin on the opposite side of the pin axis from the first structural component bearing surface engagement, the entire bearing surface regions of the first and second structural components lying on opposite sides of the pin axis and the total portion of the circumference of the pin engaged by the bearing surfaces being less than 360°, and at least one ring surrounding the pin and the bearing surface portions of the first and second components and retaining the first and second component bearing surfaces in engagement with the surface of the pin wherein the ring is mounted to permit lateral displacement of the first and second components in the direction of the axis of the pin.

2. A traction- and pressure-transmitting link joint between two structural components executing joint movements, comprising a cylindrical pin, a first structural component having a substantially semi-cylindrical bearing surface engaging the surface of the pin and lying on one side of the pin axis, a second structural component having a substantially semi-cylindrical bearing surface engaging the surface of the pin on the opposite side of the pin axis from the first structural component bearing surface engagement, the entire bearing surface regions of the first and second structural components lying on opposite sides of the pin axis and the total portion of the circumference of the pin engaged by the bearing surfaces being less than 360°, and at least one ring surrounding the pin and the bearing surface portions of the first and second components and retaining the first and second component bearing surfaces in engagement with the surface of the pin and including means adjacent to the bearing surface of at least one of the components to restrain axial motion of the pin while permitting limited lateral displacement of the components.

3. A link joint according to claim 1 or 2 including two rings surrounding the pin in a symmetrical arrangement.

4. A link joint according to claim 1 or 2, wherein one of the components is a piston and other component a connecting rod.

* * * * *